(12) United States Patent
Chen

(10) Patent No.: US 6,561,537 B1
(45) Date of Patent: May 13, 2003

(54) STROLLER WITH A RESISTANCE PROVIDING UNIT

(76) Inventor: Chin-Chiao Chen, No. 1146, Chung-Shan Rd., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/992,821

(22) Filed: Nov. 16, 2001

(51) Int. Cl.[7] ............................................. B62B 9/00
(52) U.S. Cl. .................... 280/648; 280/658; 280/62; 280/47.38; 188/20; 267/5; 482/118
(58) Field of Search .............................. 280/642, 648, 280/658, 647, 650, 657, 62; 188/19, 20; 267/3, 5; 482/62, 63, 115, 118

(56) References Cited

U.S. PATENT DOCUMENTS

| | | | | | |
|---|---|---|---|---|---|
| 2,634,137 A | * | 4/1953 | Welden | ...................... | 280/649 |
| 3,966,201 A | * | 6/1976 | Mester | ...................... | 482/72 |
| 4,438,921 A | * | 3/1984 | Szymski | ...................... | 482/57 |
| 4,509,742 A | * | 4/1985 | Cones | ...................... | 482/58 |
| 4,592,544 A | * | 6/1986 | Smith et al. | ...................... | 482/64 |
| 4,633,544 A | * | 1/1987 | Hicks | ...................... | 16/35 R |
| 4,953,880 A | * | 9/1990 | Sudakoff et al. | ...................... | 280/47.38 |
| 5,016,870 A | * | 5/1991 | Bulloch et al. | ...................... | 482/62 |
| 5,029,891 A | * | 7/1991 | Jacobs | ...................... | 280/650 |
| 5,390,771 A | * | 2/1995 | Hinkens et al. | ...................... | 188/344 |
| 5,632,362 A | * | 5/1997 | Leitner | ...................... | 188/344 |
| 5,695,212 A | * | 12/1997 | Hinkston | ...................... | 280/642 |
| 5,876,309 A | * | 3/1999 | Archey | ...................... | 482/66 |
| 5,950,772 A | * | 9/1999 | Buckley et al. | ...................... | 188/26 |
| 6,148,964 A | * | 11/2000 | Huang | ...................... | 188/26 |
| 6,152,476 A | * | 11/2000 | Huang | ...................... | 280/642 |
| 6,196,947 B1 | * | 3/2001 | Anderson | ...................... | 482/51 |
| 6,206,144 B1 | * | 3/2001 | Di Bella | ...................... | 188/26 |
| 6,230,849 B1 | * | 5/2001 | Lumpkin | ...................... | 188/24.12 |
| 6,439,077 B2 | * | 8/2002 | Lumpkin et al. | ...................... | 74/502.4 |
| 6,443,468 B1 | * | 9/2002 | Eros | ...................... | 280/47.38 |

* cited by examiner

*Primary Examiner*—Brian L. Johnson
*Assistant Examiner*—Kelly E Campbell
(74) *Attorney, Agent, or Firm*—Brinks Hofer Gilson & Lione

(57) ABSTRACT

A stroller includes a stroller frame, a wheel unit mounted on the stroller frame, a resistance providing unit mounted on the stroller frame for providing resistance against rotation of the wheel unit, and a resistance adjusting member connected to the resistance providing unit for adjusting the resistance.

2 Claims, 5 Drawing Sheets

STROLLER WITH A RESISTANCE PROVIDING UNIT

This invention relates to a stroller with a resistance providing unit for providing resistance against rotation of a wheel unit of the stroller.

The object of the present invention is to provide a stroller with a resistance providing unit for providing resistance against rotation of a wheel unit of the stroller, whereby exercise can be performed while pushing the stroller.

SUMMARY OF THE INVENTION

According to the present invention, a stroller comprises: a stroller frame including a grip; a wheel unit mounted on the stroller frame and including a plurality of wheels, each of which rotates about an axis defined by an axle; and a resistance providing unit mounted on the stroller frame and engageable with a selected one of the wheels so as to provide resistance against rotation of the selected one of the wheels when the stroller frame is pushed. The resistance providing unit includes a brake disc mounted securely on the axle of the selected one of the wheels and having opposite sides, a brake shoe support mounted on the stroller frame and defining a disc receiving space that receives a portion of the brake disc, and a pair of opposing brake shoes mounted movably on the brake shoe support and disposed at the opposite sides of the brake disc, respectively. The brake shoes are operably movable toward the brake disc in an axial direction relative to the axis so as to engage the brake disc and resist the rotation of the selected one of the wheels. An actuating string has one end operably associated with the brake shoes so as to actuate the brakes shoes to move toward the brake disc. A resistance adjusting member is mounted on the grip and is connected to the other end of the actuating string. The resistance adjusting member includes a housing defining a string moving passage, a turnable knob mounted turnably on the housing, a screw rod connected to the knob and extending into the string moving passage, a nut member threadedly engaging the screw rod and connected to the other end of the string so as to permit the string to be movable along the screw rod upon turning of the screw rod via the knob, and a positioning member connected to the housing and the knob for positioning the knob at a desired angular position relative to the housing.

BRIEF DESCRIPTION OF THE DRAWINGS

In drawings which illustrate an embodiment of the invention.

DETAILED DESCRIPTION OF THE PREFERRED EMBODIMENT

Figure 1:
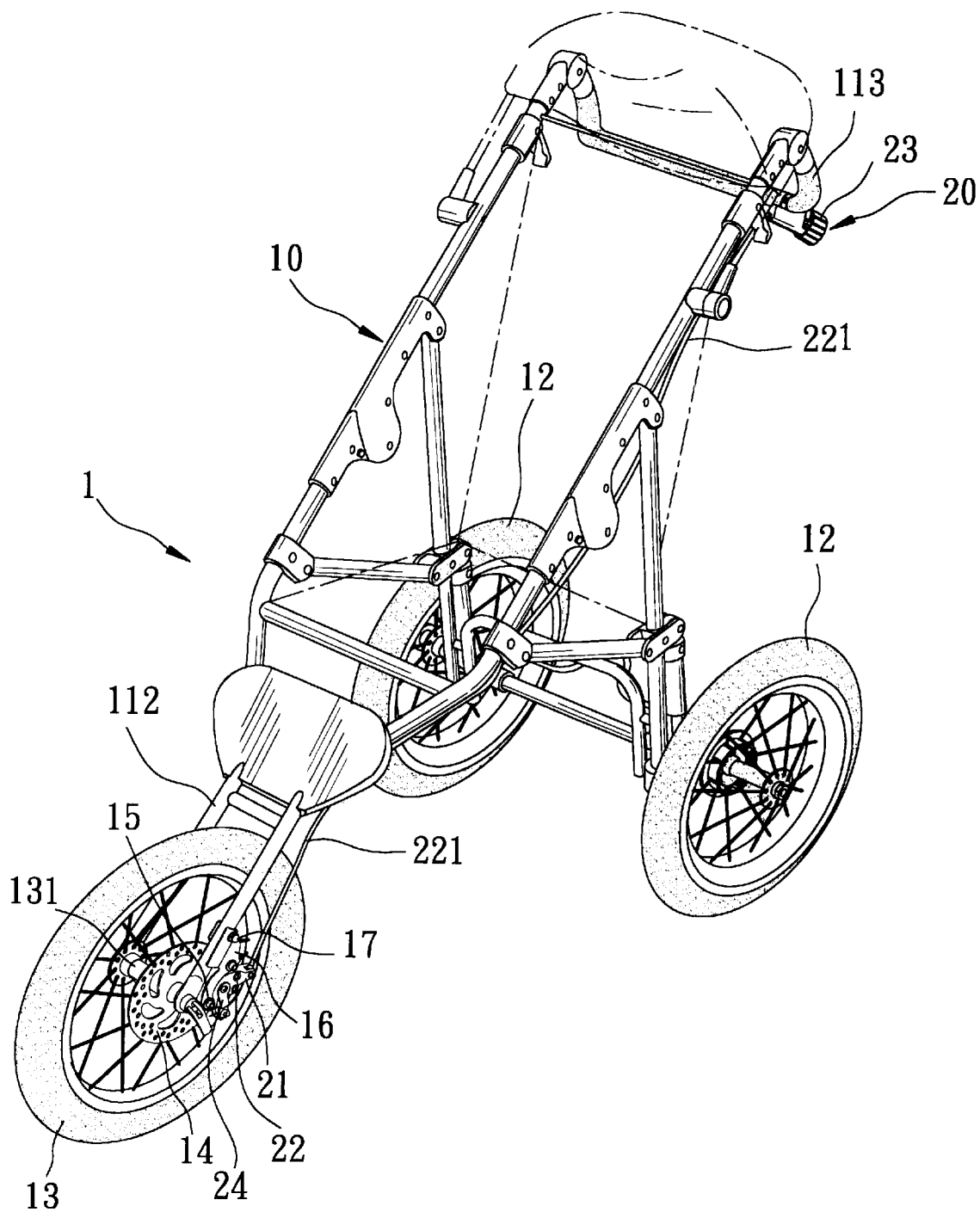
FIG. 1 is a perspective view of a stroller embodying this invention.
Figure 2:
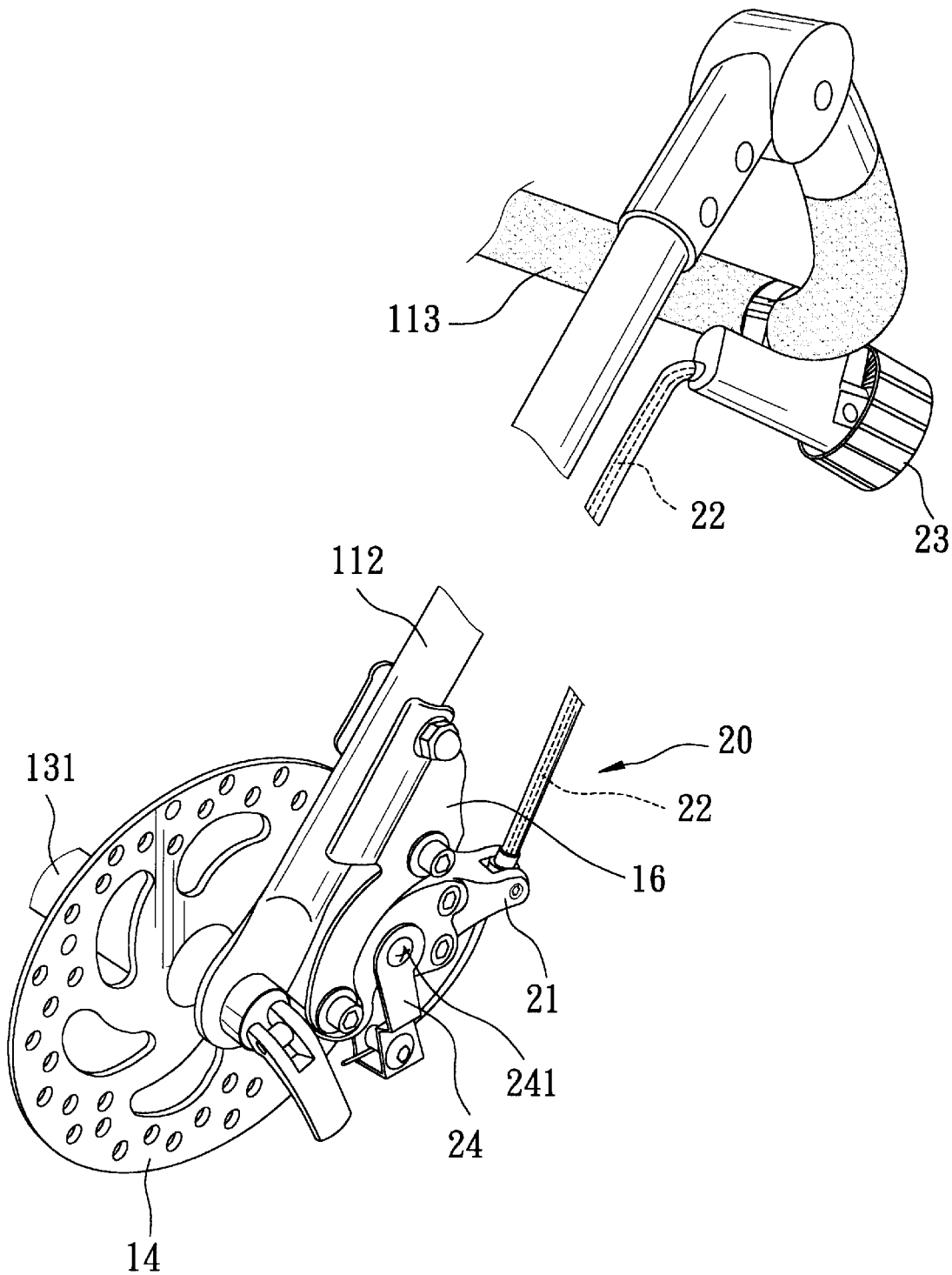
FIG. 2 is a fragmentary perspective view to illustrate how a resistance providing unit is mounted on a stroller frame of the stroller of FIG. 1.
Figure 3:
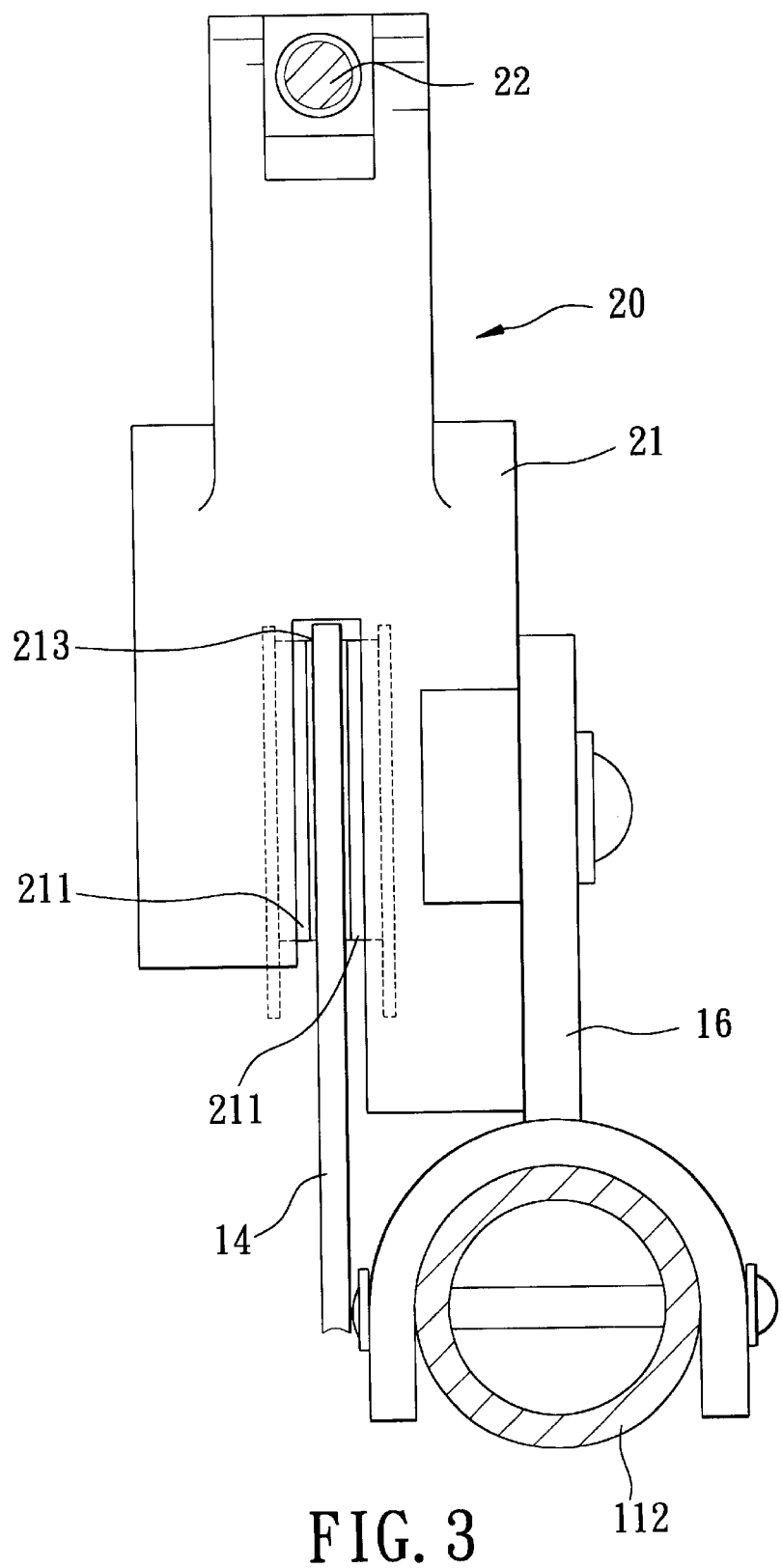
FIG. 3 is a partly sectional fragmentary schematic view to illustrate how a pair of brake shoes engage a brake disc of the resistance providing unit of FIG. 2.
Figure 4:
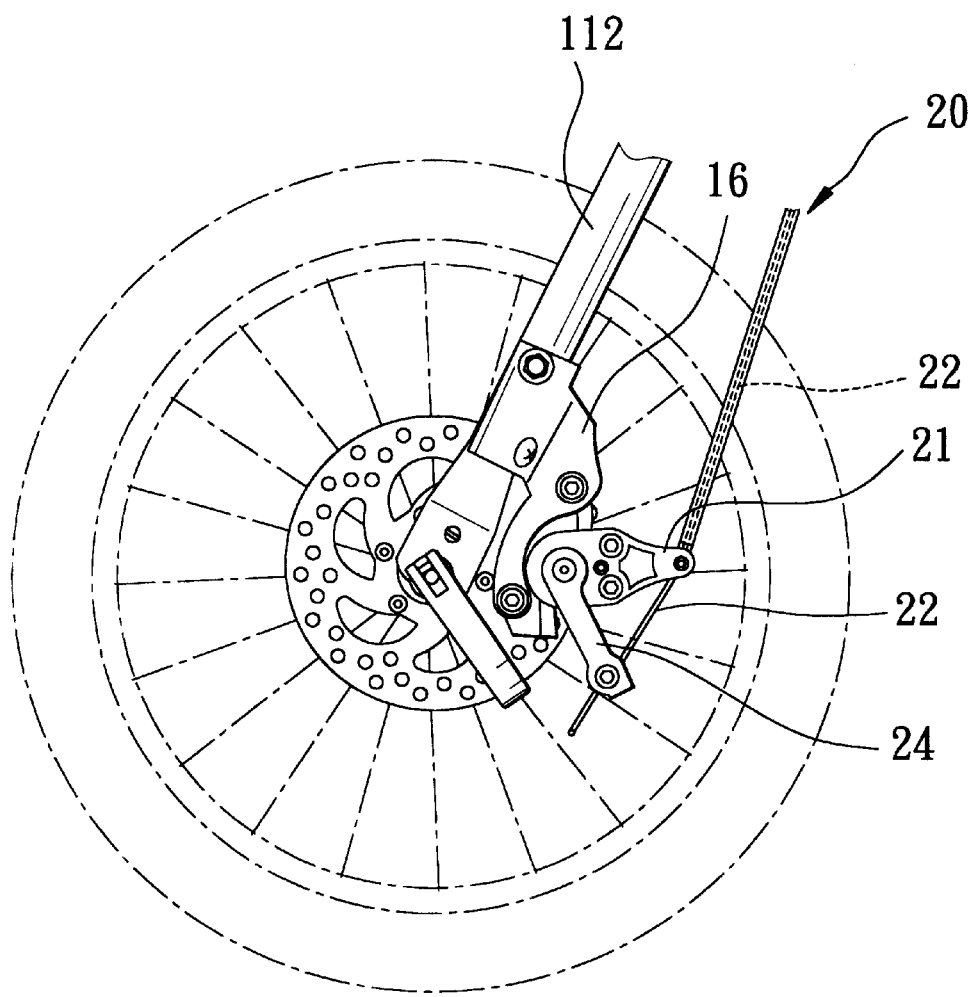
FIG. 4 is a fragmentary schematic side view to illustrate how the resistance providing unit of FIG. 2 is actuated via an actuating string.
Figure 5:
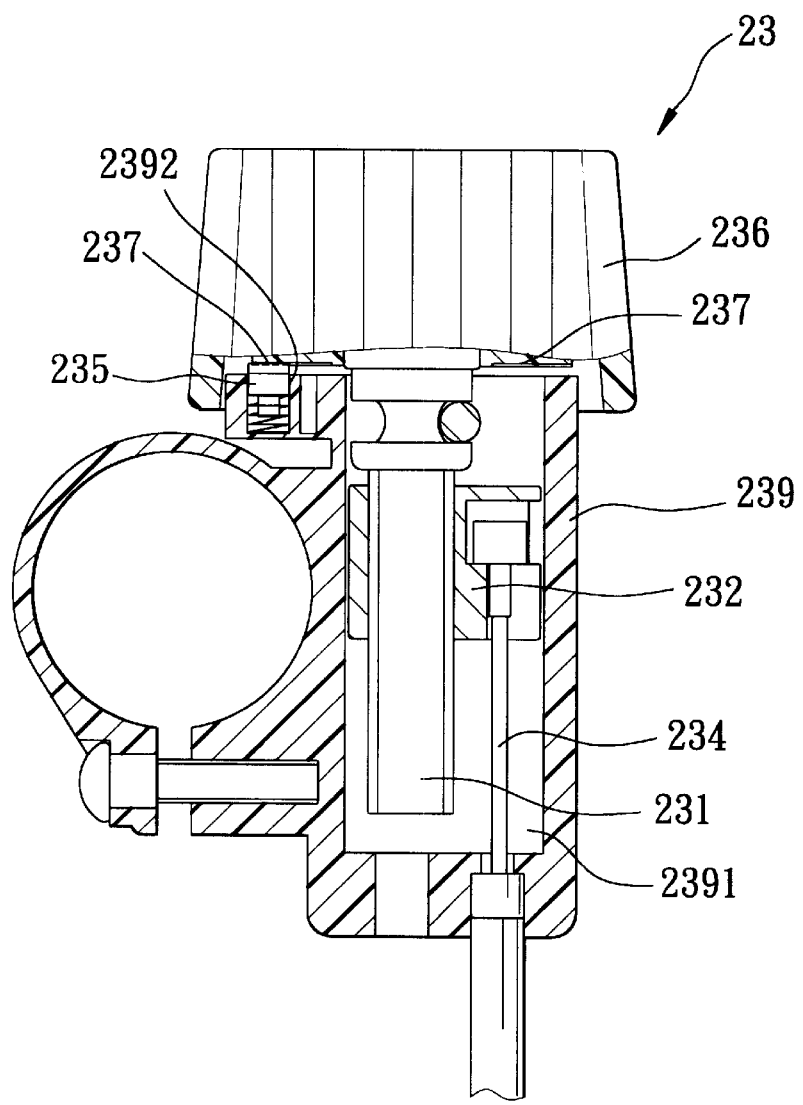
FIG. 5 is a partly sectional fragmentary view illustrating a resistance adjusting member that is engageable with the string of the stroller of FIG. 1.

FIGS. 1 to 5 illustrate a preferred embodiment of a stroller 1 that includes a stroller frame 10 with a grip 113 and a pair of front legs 112, and a wheel unit which is mounted on the stroller frame 10 and which has a front wheel 13 mounted on the front legs 112 and a pair of opposing rear wheels 12. The front wheel 13 rotates about an axis defined by an axle 131.

A resistance providing unit 20 is mounted on the front legs 112 and is engageable with the front wheel 13 so as to provide resistance against rotation of the front wheel 13 when the stroller frame 10 is pushed. The resistance providing unit 20 includes a brake disc 14 mounted securely on the axle 131 of the front wheel 14 and having opposite sides, a brake shoe support 21 mounted securely on the stroller frame 10 via a bracket 16 and defining a disc receiving space 213 that receives a portion of the brake disc 14, and a pair of opposing brake shoes 211 mounted movably on the brake shoe support 21 and disposed at the opposite sides of the brake disc 14, respectively. The brake shoes 211 are movable toward the brake disc 14 in an axial direction relative to the axis upon actuation so as to engage the brake disc 14 and resist the rotation of the front wheel 13. A link 24 is pivoted to the brake shoe support 21 about a pivot 241 and is operably associated with the brake shoes 211 via a known cam mechanism (not shown) such that turning of the link 24 in a direction about the pivot 241 actuates the brake shoes 211 to move in the axial direction. An actuating string 22 has one end connected to the link 24 so as to actuate the link 24 to turn about the pivot 241, which, in turn, actuates the brake shoes 211 to engage the brake disc 14.

A resistance adjusting member 23 is mounted on the grip 113 and is connected to the other end of the actuating string 22. The resistance adjusting member 23 includes a housing 239 defining a string moving passage 2391, a turnable knob 236 mounted turnably on the housing 239, a screw rod 231 connected to the knob 236 and extending into the string moving passage 2391, a nut member 232 threadedly engaging the screw rod 231 and connected to the other end of the string 22 so as to permit the string 22 to be movable along the screw rod 231 upon turning of the screw rod 231 via the knob 236, and a positioning member connected to the housing 239 and the knob 236 for positioning the knob 236 at a desired angular position relative to the housing 239. The housing 239 is formed with a retaining recess 2392 adjacent to the knob 236. The positioning member includes a spring-biased tongue 235 mounted in the retaining recess 2392, and a plurality of equiangularly spaced apart retaining grooves 237 formed in the knob 236. The knob 236 is turnable so as to permit the spring-biased tongue 235 to engage a selected one of the retaining grooves 237 in order to position the knob 236 at the desired angular position.

The use of the brake disc 14 and the brake shoes 211 as the resistance providing means in combination with the resistance adjusting member 23 permits an excellent control over the adjustment of the resistance applied to the front wheel 13.

With the invention thus explained, it is apparent that various modifications and variations can be made without departing from the spirit of the present invention. It is therefore intended that the invention be limited only as recited in the appended claims.

I claim:

1. A stroller comprising:
   a stroller frame including a grip;
   a wheel unit mounted on said stroller frame and including a plurality of wheels, each of which rotates about an axis defined by an axle; and
   a resistance providing unit mounted on said stroller frame and engageable with a selected one of said wheels so as to provide a resistance against rotation of the selected one of said wheels when said stroller frame is pushed, said resistance providing unit including

- a brake disc mounted securely on said axle of the selected one of said wheels, and having opposite sides,
- a brake shoe support mounted on said stroller frame and defining a disc receiving space that receives a portion of said brake disc,
- a pair of opposing brake shoes mounted movably on said brake shoe support and disposed at said opposite sides of said brake disc, respectively, said brake shoes being operably movable toward said brake disc in an axial direction relative to said axis so as to engage said brake disc and resist the rotation of the selected one of said wheels,
- an actuating string having one end operably associated with said brake shoes so as to actuate said brake shoes to move toward said brake disc, and
- a resistance adjusting member mounted on said grip and connected to the other end of said actuating string, said resistance adjusting member including a housing defining a string moving passage, a turnable knob mounted turnably on said housing, a screw rod connected to said knob and extending into said string moving passage, a nut member threadedly engaging said screw rod and connected to the other end of said string so as to permit said string to be movable along said screw rod upon turning of said screw rod via said knob, and a positioning member connected to said housing and said knob for positioning said knob at a desired angular position relative to said housing.

2. The stroller of claim 1, wherein said housing is formed with a retaining recess adjacent to said knob, said positioning member including a spring-biased tongue mounted in said retaining recess, and a plurality of equiangularly spaced apart retaining grooves formed in said knob, said knob being turnable so as to permit said spring-biased tongue to engage a selected one of said retaining grooves in order to position said knob at the desired angular position.

* * * * *